United States Patent
Gibellini (10) Patent No.: US 7,946,033 B2
(45) Date of Patent: May 24, 2011

(54) METHOD AND APPARATUS FOR MANUFACTURING A LEAD TERMINAL

(75) Inventor: Folco Gibellini, Morcote (CH)

(73) Assignee: Accuma Plastics Limited, Corby-Northamptonshire (GB)

( * ) Notice: Subject to any disclaimer, the term of this patent is extended or adjusted under 35 U.S.C. 154(b) by 122 days.

(21) Appl. No.: 11/667,086

(22) PCT Filed: Nov. 14, 2005

(86) PCT No.: PCT/EP2005/012176
§ 371 (c)(1),
(2), (4) Date: May 4, 2007

(87) PCT Pub. No.: WO2006/053698
PCT Pub. Date: May 26, 2006

(65) Prior Publication Data
US 2008/0233779 A1    Sep. 25, 2008

(30) Foreign Application Priority Data
Nov. 17, 2004    (GB) .................................. 0425342.3

(51) Int. Cl.
*H01R 43/16* (2006.01)
(52) U.S. Cl. .............. 29/874; 29/33 M; 29/747; 29/882; 439/801
(58) Field of Classification Search ............ 29/745–749, 29/884, 623.1; 72/126, 112, 125; 439/404, 439/604, 606; 429/178–184
See application file for complete search history.

(56) References Cited

U.S. PATENT DOCUMENTS

| | | | |
|---|---|---|---|
| 4,945,749 A | | 8/1990 | Walker et al. |
| 5,077,892 A | * | 1/1992 | Nugent ........................... 29/874 |
| 5,349,840 A | | 9/1994 | Ratte et al. |
| 5,373,720 A | | 12/1994 | Ratte et al. |
| 5,632,173 A | | 5/1997 | Spiegelberg et al. |
| 5,655,400 A | | 8/1997 | Spiegelberg et al. |
| 5,791,183 A | | 8/1998 | Spiegelberg et al. |
| 6,195,860 B1 | * | 3/2001 | Di Rosa et al. ............... 29/33 R |
| 6,644,084 B1 | | 11/2003 | Spiegelberg |
| 6,688,148 B1 | | 2/2004 | Hartzell et al. |
| 6,803,146 B2 | * | 10/2004 | Key et al. ...................... 429/182 |
| 7,021,101 B2 | | 4/2006 | Spiegelberg |
| 7,070,441 B1 | | 7/2006 | Gregory et al. |
| 7,338,539 B2 | | 3/2008 | Ratte et al. |
| 2008/0233779 A1 | * | 9/2008 | Gibellini ....................... 439/202 |

FOREIGN PATENT DOCUMENTS
EP    0 590 284 A3    4/1994
* cited by examiner

*Primary Examiner* — Minh Trinh
(74) *Attorney, Agent, or Firm* — Scully, Scott, Murphy & Presser, P.C.

(57) ABSTRACT

A method of manufacturing a lead terminal for an accumulator by plastic deformation on a cold-working apparatus that has a shaping station (2) and at least one deformation station (30. 40, 50, 60, 80) by shaping, at the shaping station, a slug (7) that has a longitudinal extension along a longitudinal axis such as to provide base (9) and contact (8) parts for the terminal and a size commensurate with the size of the terminal end piece to be manufactured; transferring the slug (7) to the deformation station (30, 40. 50, 60, 80); carrying out a first deformation of the slug (7) for inner and outer shaping of its base part (9); and carrying out a second deformation of the slug (7) for performing at least a further inner and outer shaping of the base part (9), the deformations being performed sequentially as progressive deformation steps.

10 Claims, 12 Drawing Sheets

METHOD AND APPARATUS FOR MANUFACTURING A LEAD TERMINAL

TECHNICAL FIELD

The present invention relates to a method and an apparatus for the production of a so-called terminal pole or terminal for a lead-acid type accumulator and to the terminal so made.

BACKGROUND ART

Currently, poles for accumulators are made in lead, generally in standardised forms, at least as regards the contact end. Poles are known that have a tapered contact part and a base part. The latter may be provided with protruding flange, labyrinth, and/or thread-like elements that improve sealing embedding of such base part into the plastic material of the accumulator cover. The two parts are either obtained separately and thereafter joined by soldering or by other suitable methods, or as a one, monolithic element. Eventually, a terminal pole should have a compact structure with no pores that may allow leakage or venting of the accumulator content. Pores also promote early corrosion and oxidation of the pole, limiting thus its conductivity.

Ordinary terminals are made, principally, with the methods known as drop casting, die-casting, roll-forming or pressing.

In the first, drop casting method, the lead is melted and poured into moulds that yield poles of the desired final shape. Proceeding in this way, terminals are obtained however with little resistance to corrosion and prone to causing the seeping of the acid from within the accumulator towards the exterior because of the porosity and the presence of damaging blowholes in the structure of the pole. Thus, efficient seal, between the plastic cover and the pole, is often not obtainable.

In the second method the lead is subjected, in the melted state, to a die-casting process. In this case, the high-pressure die-casting, ensures slight improvements relative to the surface porosity and production velocity. The defects typical of the previous method are nevertheless not completely eliminated.

In the third, roll-forming method shaped, forming rolls are used to obtain terminals with good compaction features. Generally such method and the devices used are employed as a final, additional working operation of the die-casting method. The resulting process therefore is complicated, involves complex additional systems and method steps and has rather low productivity.

In the fourth method the pole is manufactured by pressing, starting from a previously calibrated, generally cylindrical lead element, which therefore always needs preliminary processing and equipment to obtain a diameter and length in required tolerance. This element is placed in a press mould, which gives a semifinished product having a shape similar to the final one, but which has to be finished with further operations in which end parts of the semifinished product are removed. Satisfactory compactness degree, i.e. lack of pores, is achieved but the method ensures rather low productivity and requires very sturdy devices due to the high working stress involved by the deformation process.

Furthermore, different operations are carried out on different machines and the percentage of material that results in the end as manufacturing waste is high, being in the range of 20-25% of the total material employed.

Consequently, the production costs are rather high.

DISCLOSURE OF THE INVENTION

The aim of the present invention is to provide a method and an apparatus to carry out the method, which are adapted for production, by plastic deformation, of terminal poles for accumulators of a high quality, both as regards the compactness of the finished product and the required dimensional tolerances.

Within this aim, an important object of the invention is to provide a method and related apparatus with high productivity and capable to cut on the production times and costs, eliminate the necessity of preliminary transformations and reduce to a minimum percentage, preferably in the range of 3-4%, more preferably under 3% and possibly as low as 0% of the total material employed, the material resulting as manufacturing waste, such waste being in any event reusable for reprocessing.

Another object of the invention is to provide a method and related apparatus that are suitable for manufacturing any type of standardised terminal pole, and even poles with particular shapes, either monolithic or multi-part.

A further object of the invention is to provide a method and a related apparatus, with light structure, low power consumption and low wear in the active parts, that need little supervision and maintenance operations, suitable to be carried out and, respectively, operated in an environment friendly manner.

Yet another object of the invention is to provide a method and an apparatus particularly suitable for high operation speed, with no downtimes, and suitable for producing poles with different and selected sizes, irrespective of the dimensions of the starting, raw material.

This aim and these and other objects that will become better apparent hereinafter are achieved by a method of manufacturing a lead terminal for an accumulator, according to one aspect of the present invention, by plastic deformation on a cold-working apparatus that has a shaping station and at least one deformation station, comprising the steps of: a) shaping, at the shaping station, a slug that has a longitudinal extension along a longitudinal axis thereof such as to provide base and contact parts for the terminal and has a size commensurate with the size of the terminal end piece to be manufactured; b) transferring the slug to said at least one deformation station of the apparatus; c) carrying out a first deformation of the slug for inner and outer shaping of the base part thereof; and d) carrying out at least a second deformation of the slug for performing at least a further inner and outer shaping of the base part thereof, and wherein the steps c) and d) are performed sequentially as progressive deformation steps.

An apparatus, according to another aspect of the present invention, for carrying out the method of manufacturing a lead terminal for an accumulator by cold plastic deformation working comprises: a shaping station for shaping a slug that has a longitudinal extension along a longitudinal axis thereof such as to provide base and contact parts for the terminal and a size commensurate with the size of the terminal end piece to be manufactured; at least one deformation station adapted to perform progressive and sequential deformations of the slug by way of inner and outer shaping carried out at the contact and base parts thereof; and transfer means for transferring the slug to be worked among said stations.

Advantageous details of the invention are set forth in the subclaims.

BRIEF DESCRIPTION OF THE DRAWINGS

Further characteristics and advantages of the present invention will become better apparent from the following detailed description of a preferred but not exclusive embodiment of the method and of an apparatus for the manufacturing of a lead terminal for an accumulator, illustrated by way of non-limiting example in the accompanying drawings, wherein.

WAYS OF CARRYING OUT THE INVENTION

With reference to the mentioned Figures, an apparatus 1 for manufacturing a lead terminal for an accumulator by cold plastic deformation working, comprises in a preferred but not exclusive embodiment thereof, a shaping station 2 for shaping a slug 7, made of a lead material.

The slug 7 has a longitudinal extension along its longitudinal axis such as to provide a base part 9 and a contact part 8 part for the terminal. The size of the slug is set to be commensurate with the size of the terminal end piece to be manufactured.

The apparatus 1 comprises at least one deformation station 30 preferably two 30, 40, and more preferably four deformation stations 30, 40, 50, 60 or 80 adapted to perform progressive deformations of the slug 7 by way of inner and outer shaping carried out at the contact 8 and base 9 parts the slug 7.

Transfer means 12 for transferring the slug to be worked among the stations 2, 30, 40, 50, 60 are further provided that may be constituted, by sets of clamps 12a that have the task of transferring the pieces from one station to the next. Other transfer means, such as mechanical or hydraulic or pneumatic grasping arms may suitably be provided.

In a preferred but not exclusive embodiment, as many sets of clamps 12a as the shaping and deformation devices and stations of the machine are, may be provided.

The shaping station 2 comprises unreeling means 3, for unreeling a lead wire 4 from a wire reel 5. Wire drawing and straightening means 6 for drawing and straightening the lead wire 4 that may coincide with the unreeling means and which may be constituted by pairs of rollers 6a, are provided located downstream of the wire reel 5. Cutting means 13 to cut the wire 4 at desired lengths equip the shaping station 2.

Other suitable drawing/straightening means may be used instead of the pairs of rollers, such as pairs of sliding shoes adapted to close on the wire 4 to straighten and making it advance.

The cutting means 13 may be constituted, in a preferred embodiment, by a fixed matrix 13a that has an internal channel 14a in which wire 4 is fed and by a movable matrix 13b that has an inner cavity 14b adapted to receive a pre-set length of wire 4 fed through the fixed matrix. The wire length is set in accordance with the desired dimension of the terminal to be shaped. The movable matrix 13b is adapted to move with respect to the fixed matrix 13a so as to provide cutting out of a slug 7 that corresponds to the pre-set length of wire 4. The cutting means 13 are further fitted with an arresting punch 13c, adapted to arrest advancement of the wire 4 in the movable matrix 13b, upon accommodation therein of the pre-set length of wire 4 and with an expeller punch 13d for expelling the cut out slug 7 from the movable matrix 13b.

Additionally and advantageously, the shaping station 2 may be provided with a calibration device 100 (see FIGS. 10A-10B) that is adapted to calibrate the length of wire cut by the cutting means 13 at a required diameter and overall shape.

Figure 10A:
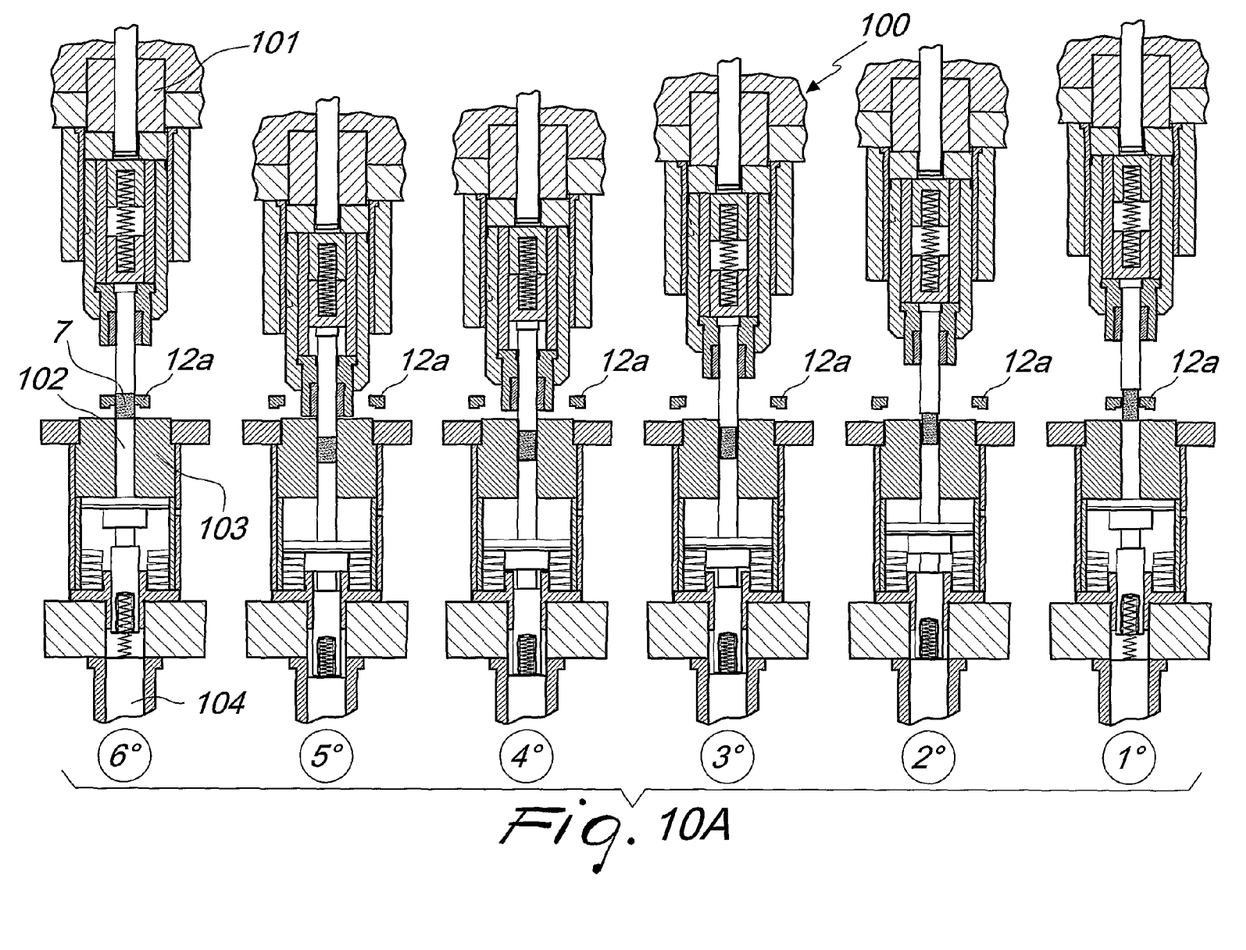
FIG. 10A is a front view of a calibration device of the apparatus, shown in cross-section, that illustrates calibration phases of slugs in a pre-deformation step.
Figure 10B:
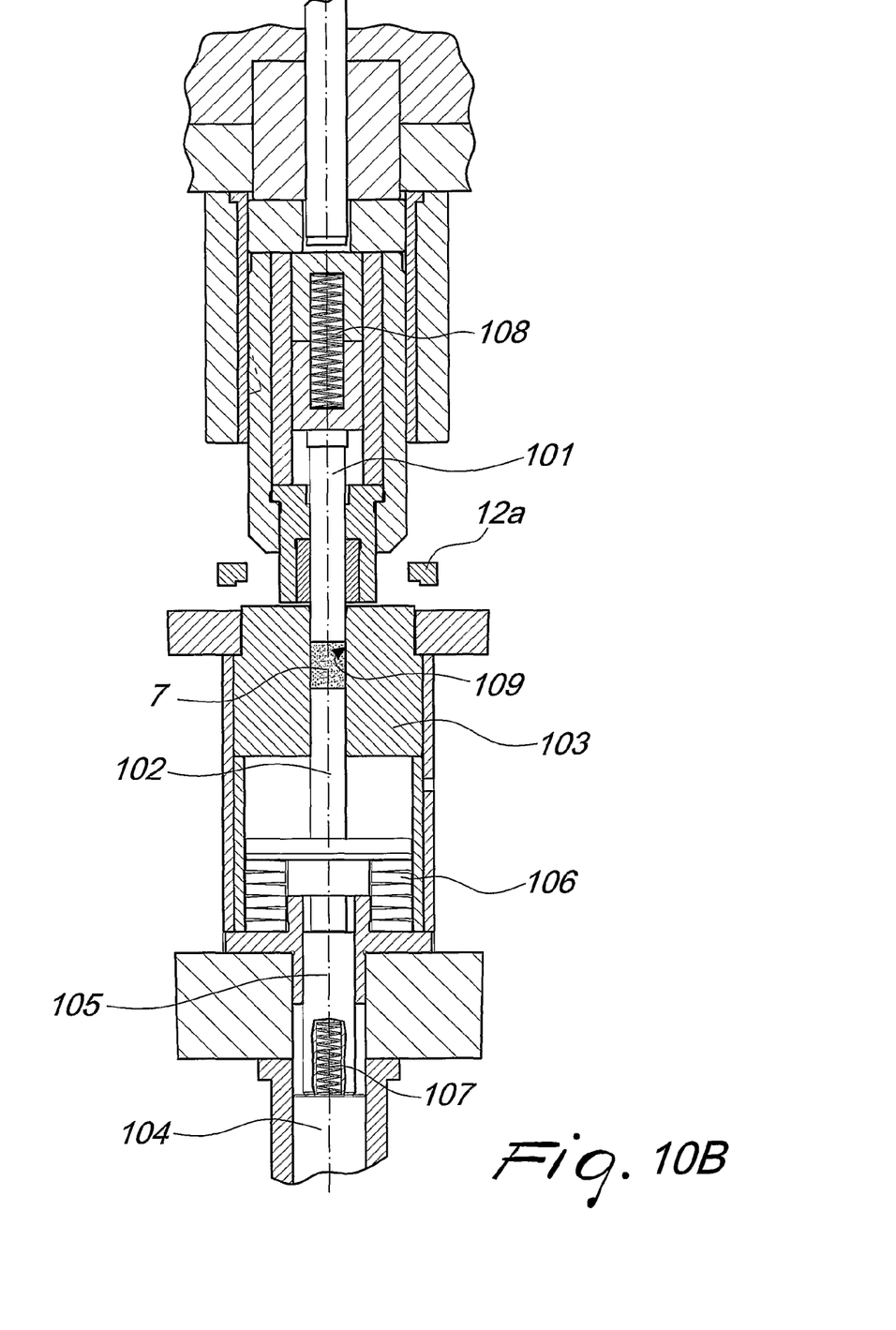
FIG. 10B is a front sectional view of the calibration device, according to the invention.

The calibration device 100 allows to use, as a starting material, wire with different diameters, even smaller than the diameter of the slug 7 that has to be subsequently processed at the deformation stations.

The calibration device 100 comprises a calibration matrix 103 and a hammer punch 101. The latter is axially biased by a spring 108 and is movable to press a wire length transferred from the cutting means 13 and supported by clamps 12a. The calibration matrix 103 is provided with a calibration matrix punch 102, that is axially movable inside a calibration cavity 109 of the calibration matrix 103 under the pushing action of the wire length, pushed inside the calibration cavity 109 of the matrix 103 by the hammer punch 102. An expeller, constituted by a cup-shaped container 105 is arranged movable axially in the calibration cavity 109 and encloses elastic means, constituted by a spring 107. A wire length can thus be calibrated in the cavity 109 by virtue of the pressing force exerted thereon by the hammer punch 101 that is opposed by an elastic resistance exerted through the matrix punch 102 under the push of the expeller 105, biased by the spring 107.

At least one deformation station 30 is provided for the apparatus (FIG. 1) that comprises a fixed part 20 and a movable part 21 aligned along a work axis Y. The movable part 20 is movable along the work axis Y.

Figure 1:
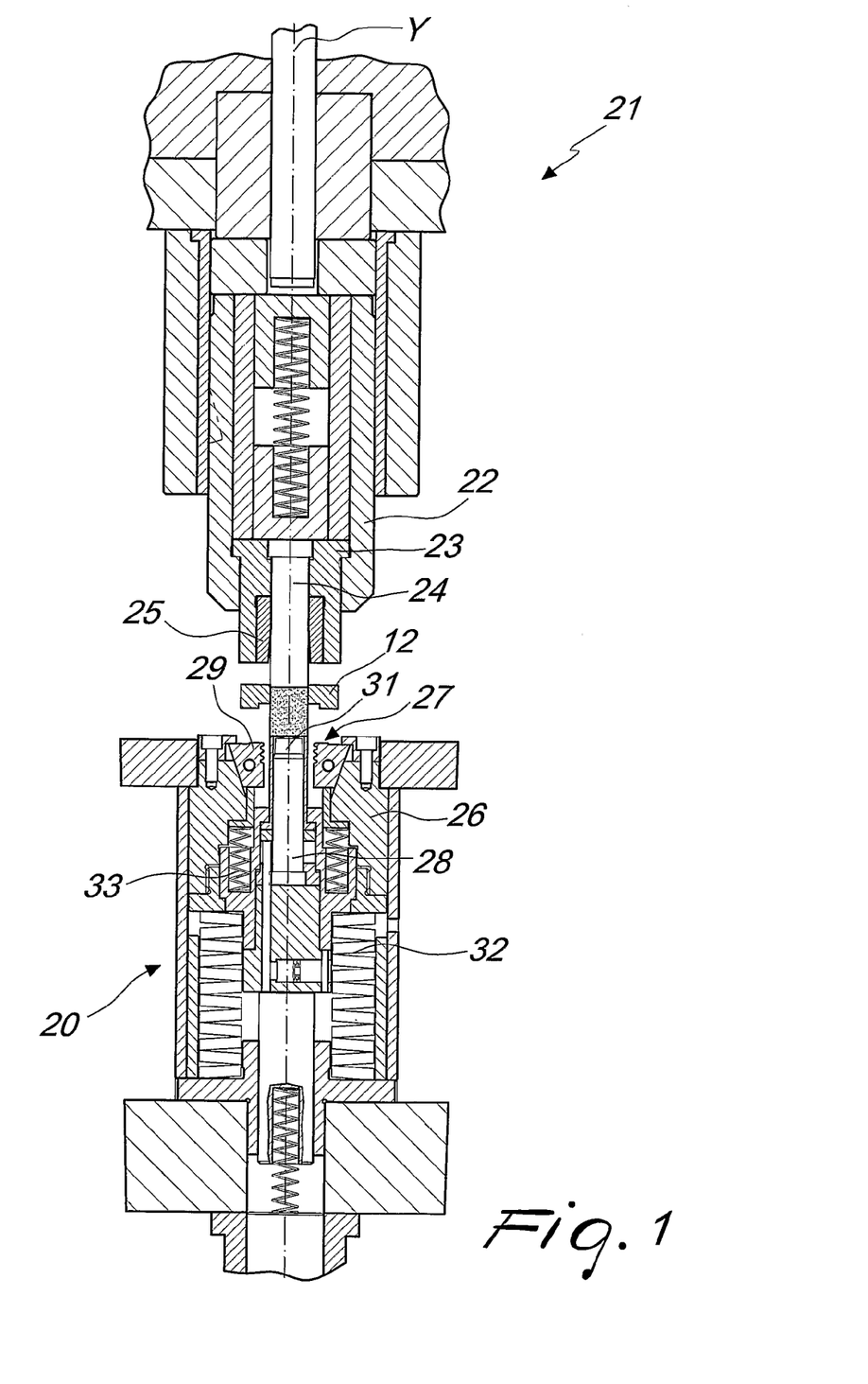
FIG. 1 is a cross-sectional front view of a deformation station of the apparatus according to the invention.

The movable part 21 comprises a punch jacket 22, a punch holder 23 enclosed by the punch jacket 22, a hammer punch 24 that is accommodated in the punch holder 23, and a punch insert 25 enclosed by the punch holder 23 and partly enveloping the hammer punch 24. The punch holder 23 is slidable on the hammer punch 24. The punch jacket 22, punch holder 23, hammer punch 24 and punch insert 25 are mounted in the station 30 coaxial, along the work axis.

The fixed part 20 comprises a die holder 26 with a segmental die 27 slidably enclosed therein. A die punch 28 is movably accommodated in the die holder so as to move with respect to and inside the segmental die 27. The die holder 26, segmental die 27 and die punch 28 are mounted in the deformation station coaxial, along the work axis Y.

The segmental die 27 is substantially shaped as a truncated cone bushing with an outer tapering surface and an inner hole with a shaping die surface. The bushing is formed by a plurality of segments 29, for example eight segments, and can slide in the die holder 26 with its tapering outer surface in sliding contact with a complementarily tapered surface of the die holder 26. Such bushing 27 slides between a protruding position in which the segments 29 are spread apart in order to receive the base part 9 of a slug 7 to be worked, and an inserted position in which the segments 29 are closed together to form a first half-die adapted to shape by plastic deformation the base part of the slug 7.

The first half die in the inserted position of the segmental die 27 is so shaped so as to advantageously form on the base part 9 of the slug, a labyrinth configuration with protruding ridges 9a that may be flat sided and have undercut root portions 9b.

The die punch 28 has a pushing end 31 that is shaped so as push, upon closure of said segments 29, into the base part of the slug 7 to form therein an inner cavity.

The punch insert 25 is shaped as a sleeve that has an inside taper adapted to shape a corresponding taper of the contact part 8 of the finished terminal. Such inside taper forms a second half-die that cooperates with the first half-die formed by the segmental die 27 for the plastic deformation of the slug 7.

The fixed part 20 is provided with at least one first bias spring 32, that may be provided as a Belleville washer spring, and at least one second, segment supporting, bias spring 33. The springs 32, 33 are mounted in the fixed part 20 under and so as to bias the segmental die 27 in the protruding position in which the segments 29 are spread apart.

The hammer punch 24 can be actuated to move along the work axis Y and push on the slug so as to overcome the bias exerted by the first and second bias springs 32, 33 and to move the segmental die 27 in the inserted position, whereupon the first and second half-dies form together a shaping die 34 that encloses and shapes the slug 7 at a desired shape upon pressure exerted by the hammer punch 24 on an end of the slug 7.

The hammer punch 24 can have, in a specific configuration (FIG. 3 or FIG. 11), an active end 37 provided with a cutting profile adapted to cut out, upon complete formation of the inner cavity, the bottom end portion thereof to form in the slug 7 the through hole 11. An inner channel 36 with an outlet opening 39 adapted to allow knockout of the cut bottom end portion 38 can be further provided, in said configuration, in the hammer punch 24. The die punch 28 may also be provided with an inner hole 35 connectable to a pressurised air feeding 41 for pushing the cut out bottom end portion 39 through the inner channel 36.

In an embodiment, suitable, for example, to shape non-holed terminals, the apparatus comprises a first 30 and a second 40 deformation stations. In a further preferred but not exclusive embodiment, third 50 and fourth 60 deformation stations are additionally provided.

It is possible to provide six different deformation stations, which may allow obtaining more peculiar configurations of the base part of the terminal.

Figure 5:
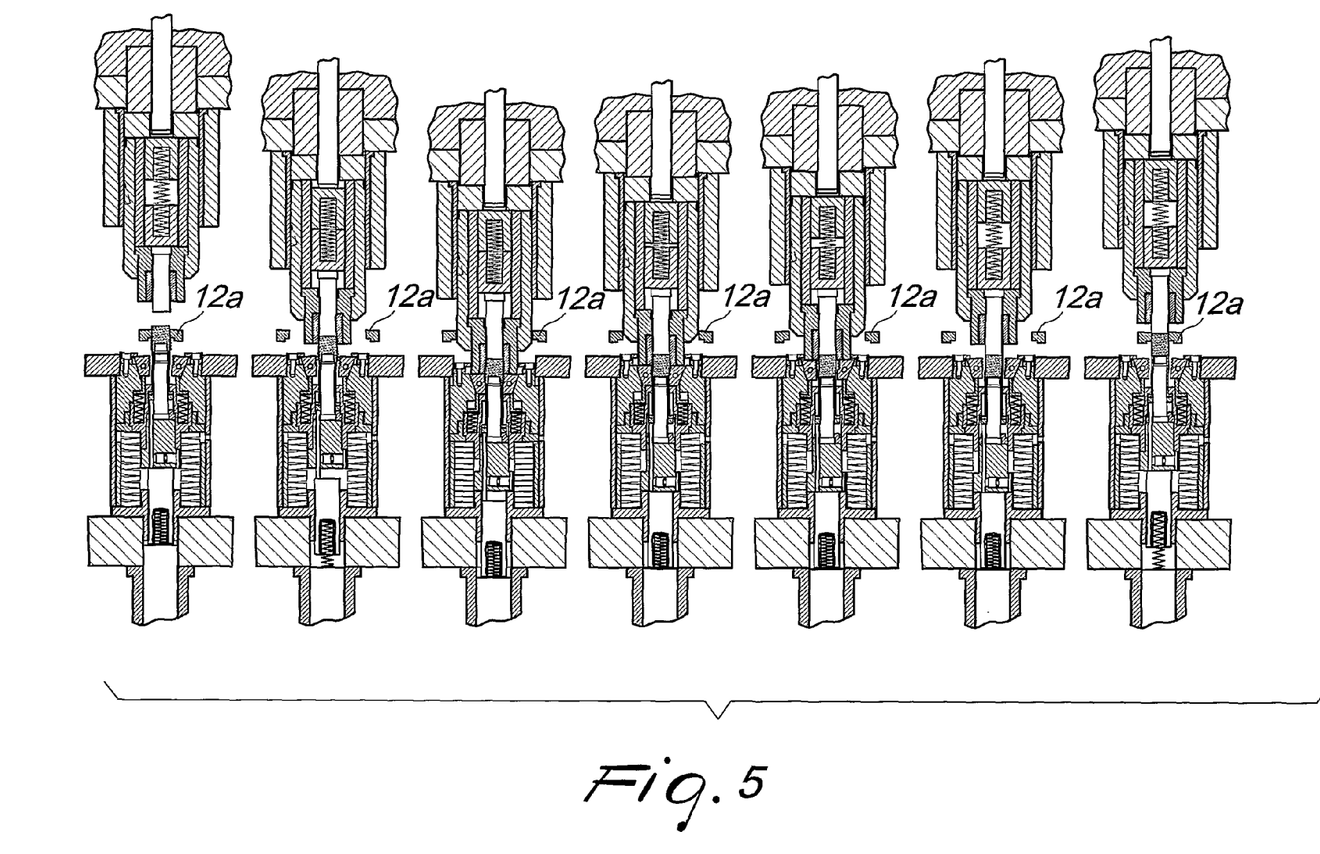
FIG. 5 is a front view of a first deformation station of the apparatus, shown in cross-section, that illustrates various phases of a first deformation step, carried out according to the method of the invention.

The first deformation station 30 is suitable for carrying out at least a first deformation for inner and outer shaping of the base part 9 of the slug 7.

Figure 6:
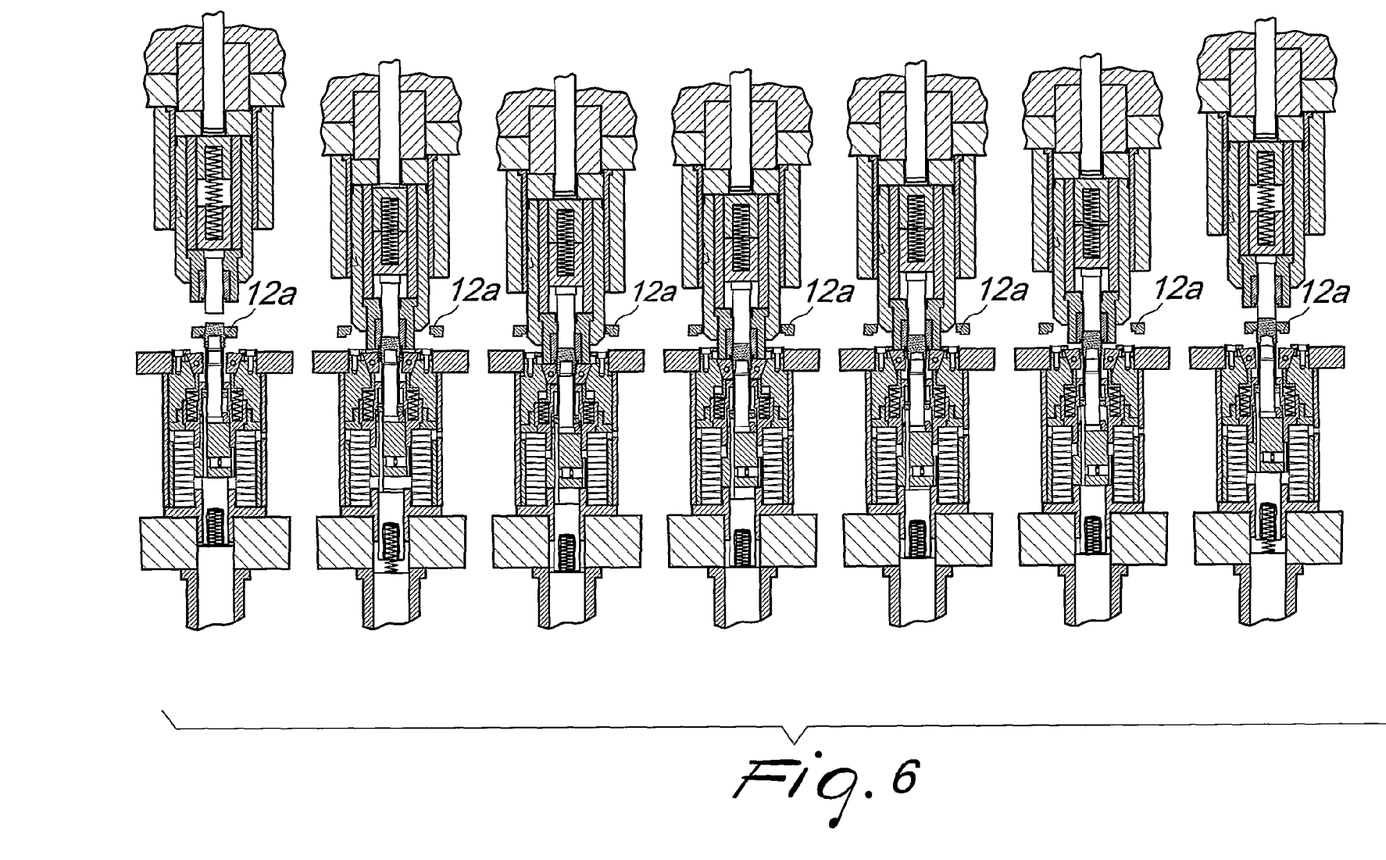
FIG. 6 is a front view of a second deformation station of the apparatus, shown in cross-section, that illustrates various phases of a second deformation step, carried out according to the method of the invention.

The second deformation station 40 performs a second deformation for further inner and outer shaping of the base part 9 of the slug 7. Optionally, an outer shaping of the contact part 8 of the slug 7, may be performed at the second station 40. A first outer shaping of the contact part 8 may also be carried out at the first deformation station 30.

Figure 7:
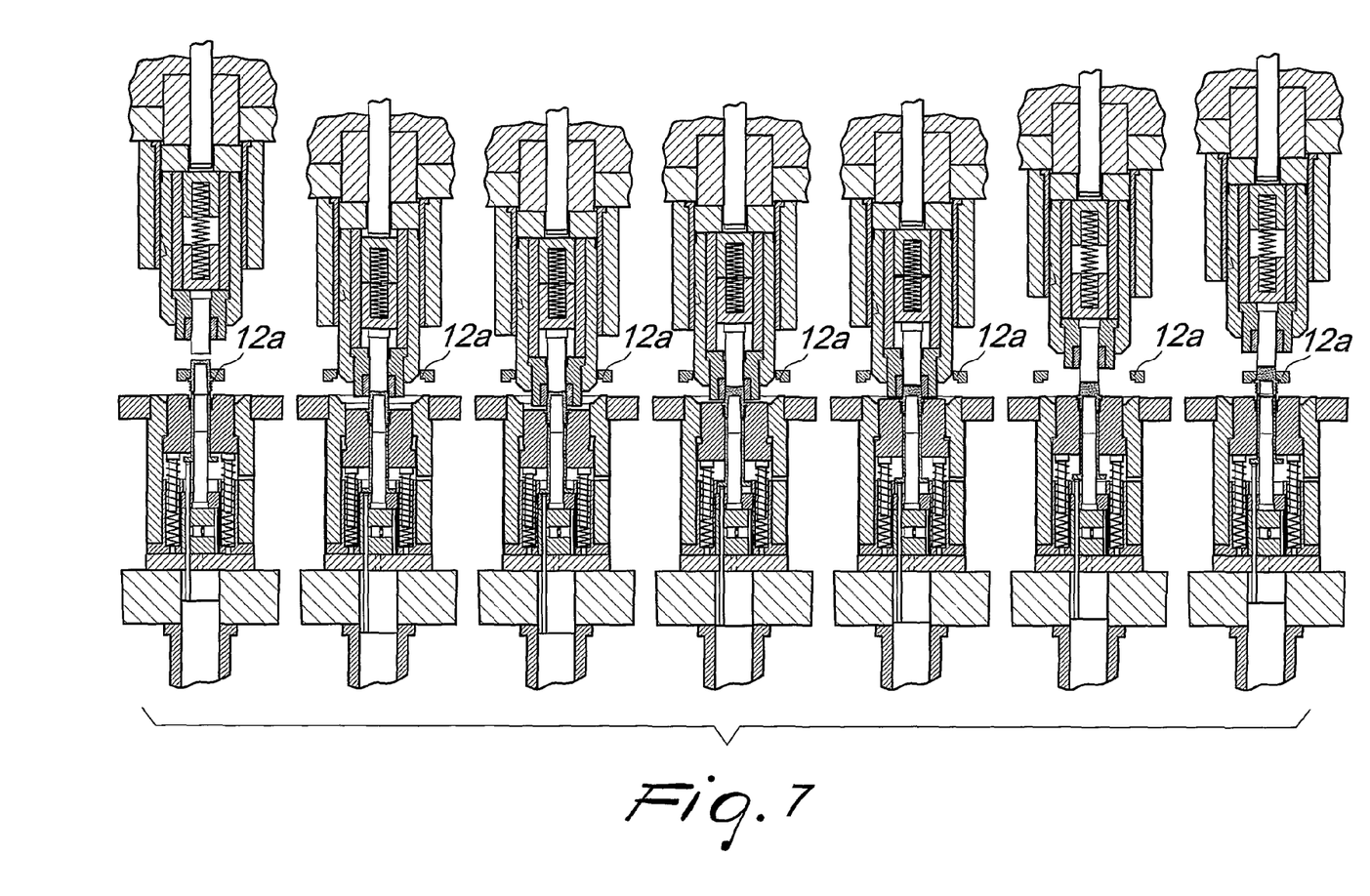
FIG. 7 is a front view of a third deformation station of the apparatus, shown in cross-section, that illustrates various phases of a third deformation step, carried out according to the method of the invention.

The third deformation station 50 is suitably fitted for a third deformation for inner and outer shaping of the contact part 8 and for a further inner shaping of the base part 9 of the slug 7. The inner cavity 11 is formed in the slug 7 that extends longitudinally, axially therein, through the base part 9 and the contact part 8, for substantially all the longitudinal extension of the contact part 8 but for a bottom end portion 38 that plugs the end part of the slug 7.

Figure 8:
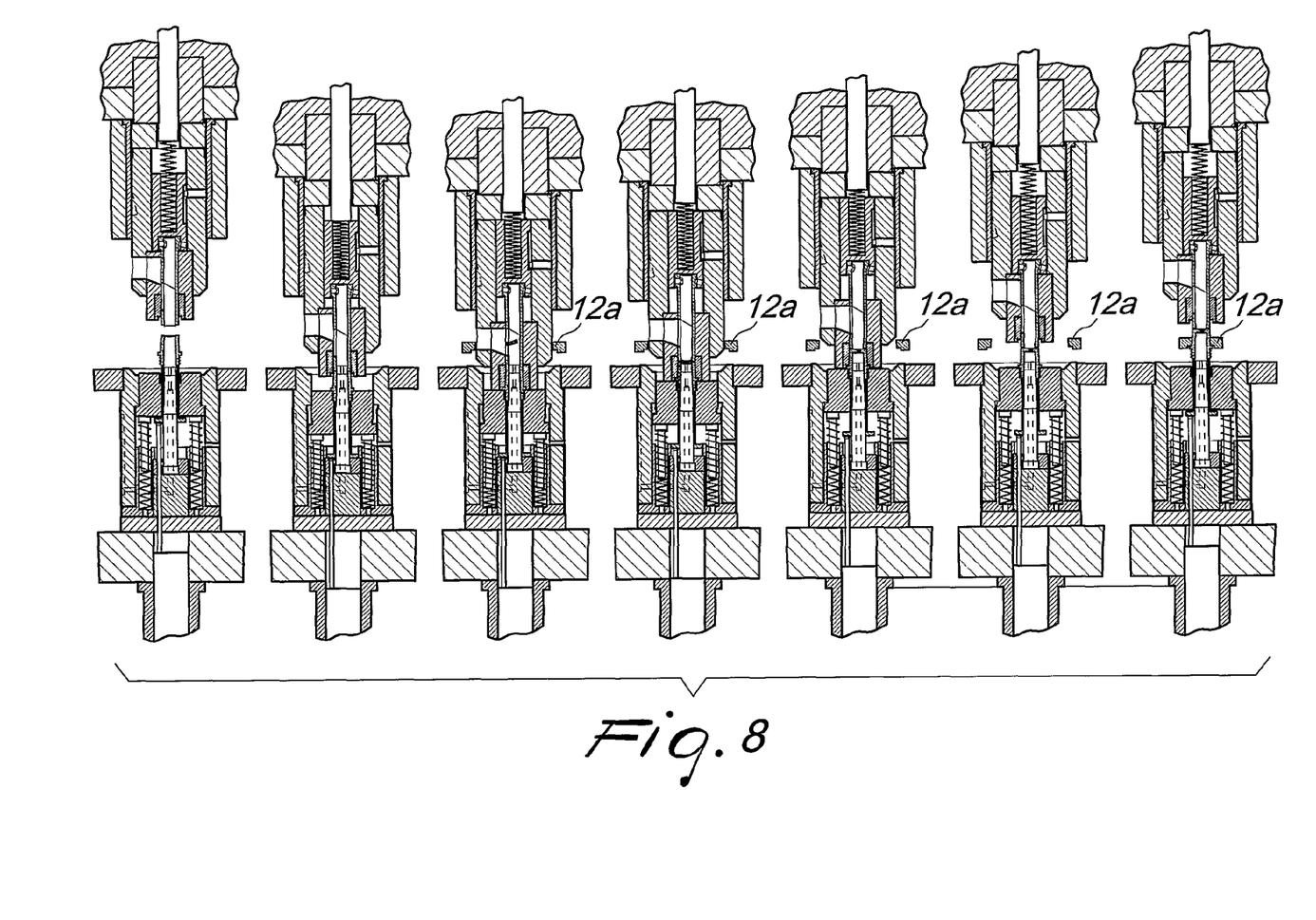
FIG. 8 is a front view of a fourth deformation station of the apparatus, shown in cross-section, that illustrates various phases of a pole holing step, carried out according to the method of the invention.
Figures 9A, 9B, 9C, 9D:
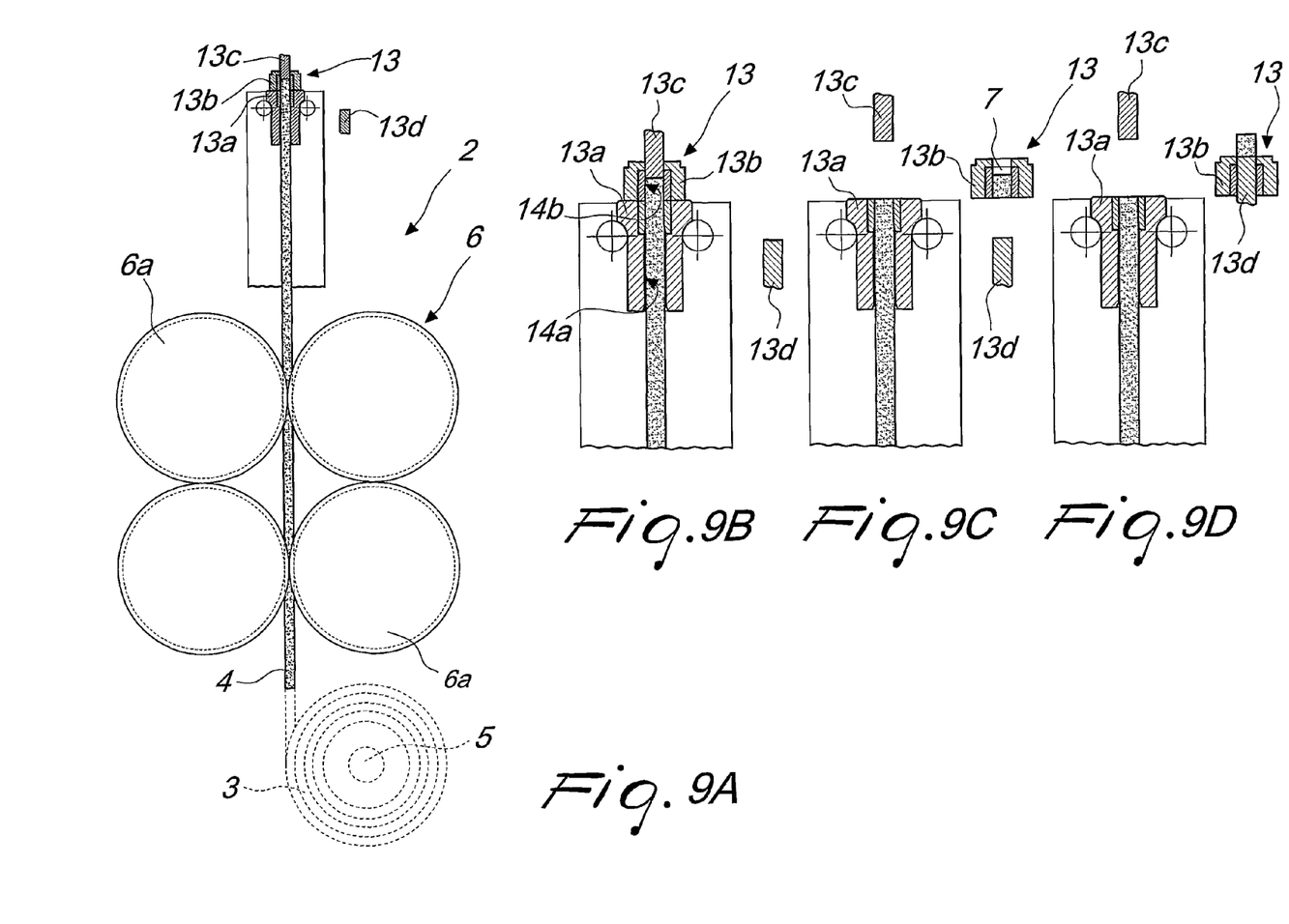
FIGS. 9A-9D are, respectively, schematic partial views of a shaping station and of cutting means of the apparatus in various operational positions, according to the invention.

The fourth deformation station 60 is suitable to provide the perforation of the inner cavity 11 of the slug 7, by way of the hammer punch 24, fitted with the active end 37, to form the through hole, also designated with 11 in the Figures, by the cutting out of the plugging, bottom end portion 38.

The shaping 2 and deformation stations 30, 40, 50, 60 are all mounted on a frame 70 enclosing movement actuation means 71, that may be of the fluid actuated type, for actuating the movable part 20 and the die punch 28.

Figure 11:
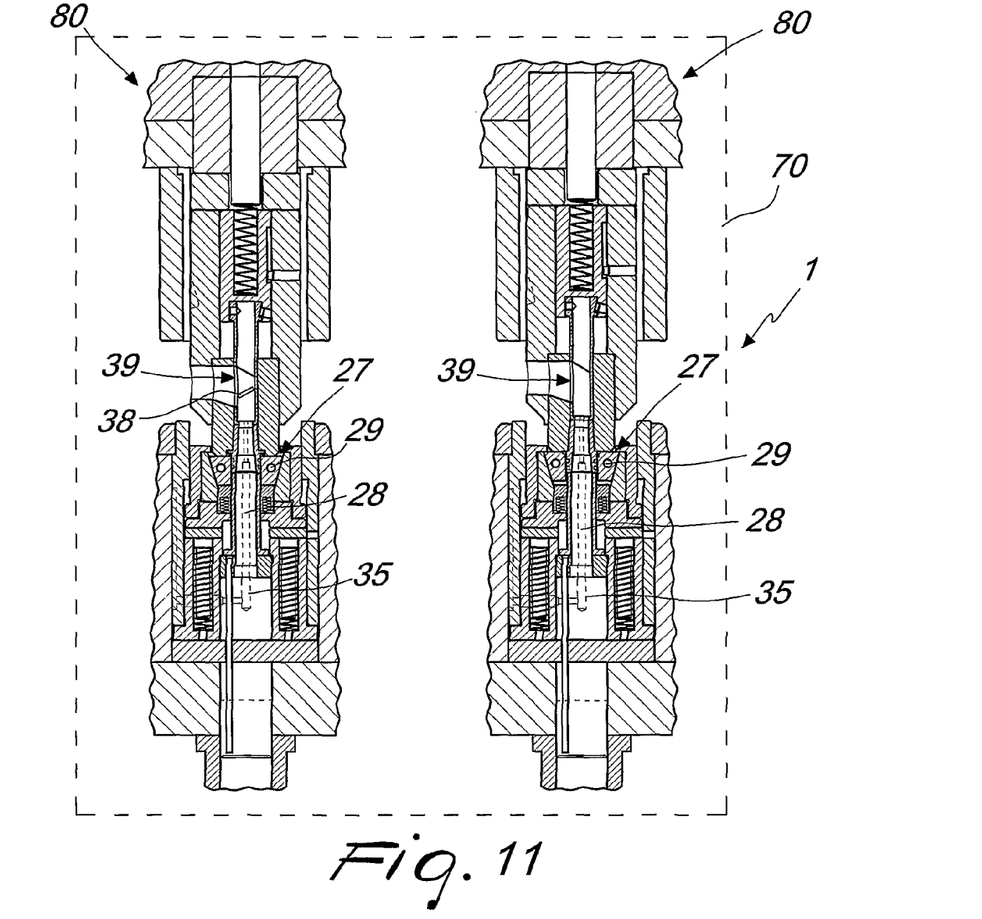
FIG. 11 is a front, cross-sectional view of a possible alternative fourth or fifth deformation station of the apparatus that illustrates a deformation step in which a terminal pole, as shown in FIG. 2B, is obtainable.

A deformation station 80, as shown in FIG. 11, may additionally be provided, or to replace station 60.

The station 80 is provided with a segmental die 27 and with a hammer punch 24 that has an active end 37 with cutting profile to form in the slug 7 the through hole 11.

The slug 7 is pre-formed at the previous deformation stations with the ridges 9a that have a crown profile with cusps 9c.

Figure 2A:
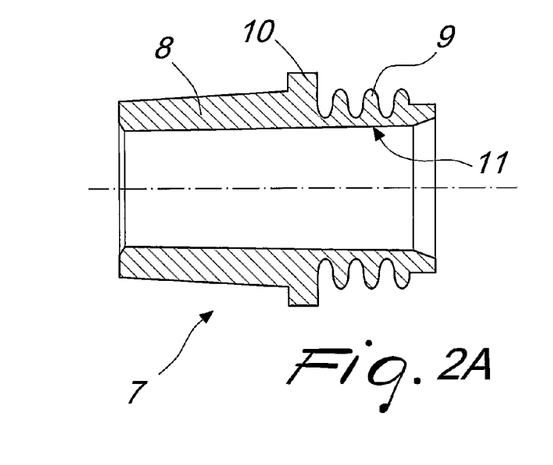
FIGS. 2A and 2B are cross-sectional, front views of two, first and second, different embodiments of terminal poles for accumulators obtainable with the method and apparatus according to the invention.
Figure 2B:
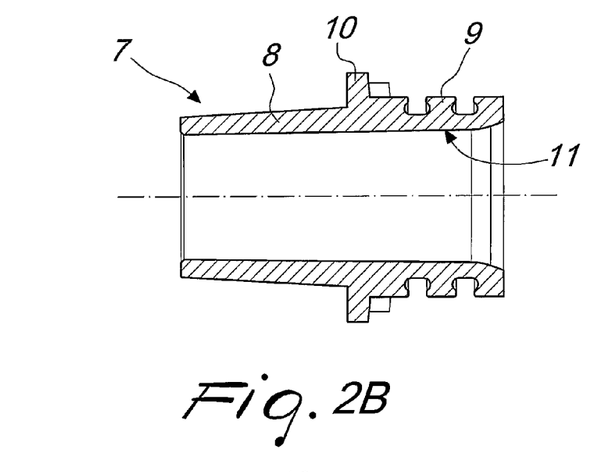
Figure 2C:
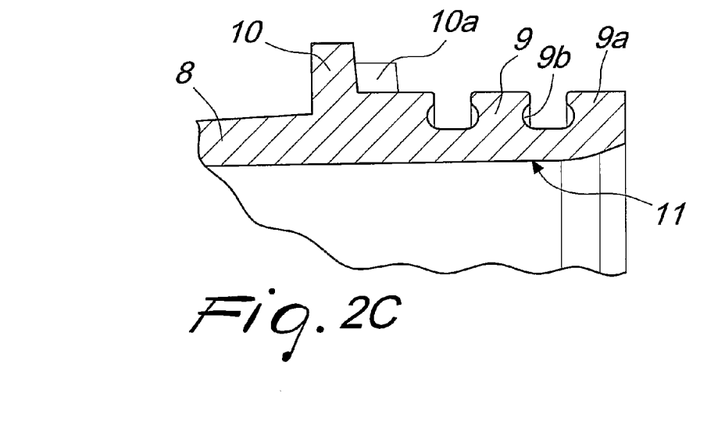
FIG. 2C is a cross-sectional, enlarged, partial view of a detail of the terminal pole of FIG. 2B.
Figure 2D:
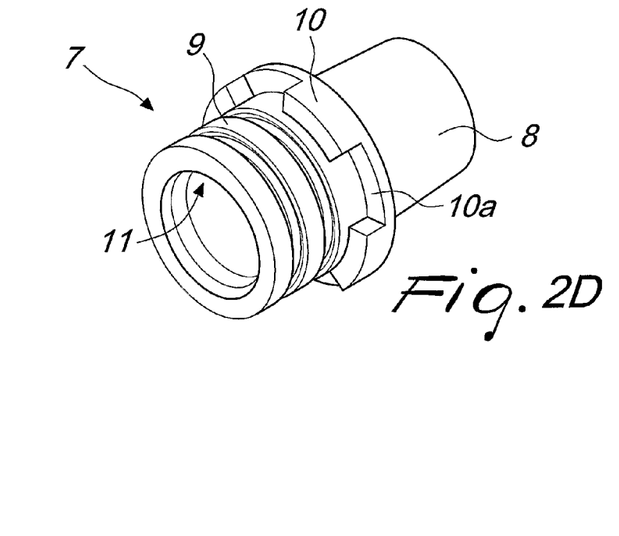
FIG. 2D is a perspective view of a terminal pole, in the second embodiment thereof, as shown in FIG. 2B.
Figure 12A:
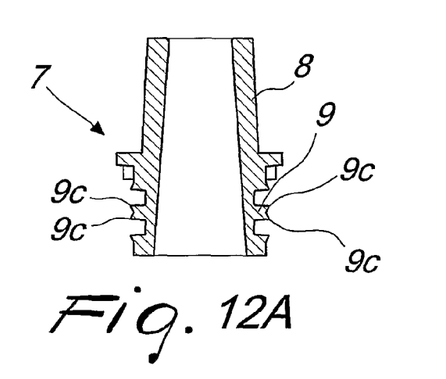
FIGS. 12A-12B are cross-sectional front views showing a terminal pole of the type shown in FIG. 2B, in the pre-final and, respectively, final phases of fabrication.
Figure 12B:
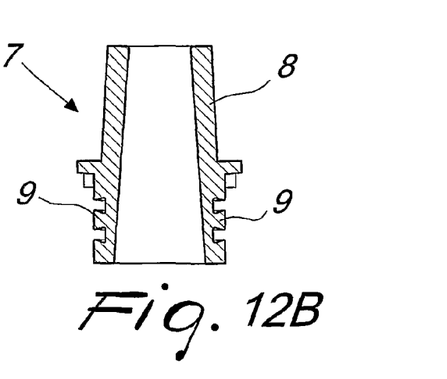

Once the slug 9 with cusped ridges is closed for deformation in the deformation station 80, the segments 29 press onto the cusps 9c to flatten them while a material migration occurs that give the ridges the mushroom form, with undercut root portion 9b, as shown in FIGS. 2B and 12B.

A control unit CU, provided with sensing means for sensing hydraulic and pneumatic pressure, temperature and position parameters of the various parts of the apparatus and to provide indicative signals, with storing and processing means to store and process the signals received from the sensing means, and also with suitable firmware or software, controls operation of the apparatus.

Operation of the apparatus can easily be understood from what has been described before and in the following.

The half-dies formed by the segments 29 and punch insert 25, on closing, permit the deformation of the slug metal and achieving of the desired shape, while on opening permit the extraction of the slug metal already deformed and insertion of the slug metal still to be deformed.

Unlike the known deformation techniques, which use as a starting product a semifinished piece, usually calibrated lead pins obtained previously on different machines, in the present invention the apparatus is supplied with a Pb continuous wire 4, wound on the metal reels 5 (coils).

The reels 5 are mounted on the unreeling device 3, that may be provided at the shaping station 2 as a part of the apparatus/machine, idle or powered according to the weight of the reel, with the unwinding axis preferably horizontal.

The lead wire 4 is then introduced into the first (shaping) station 2 of the machine for drawing-strengthening. In such first station 2 rollers or runners 6*a* have the task of advancing "in jerks" the wire to the cutting means 13 at lengths of the wire slug 7 adjustable as a function of the size of the end piece that is desired to be produced.

In the cutting station constituted by the cutting means 13 the wire is first of all introduced into the fixed (knife) matrix 13*a* formed by a block of steel in which a hard metal insert is housed with the characteristic of being interchangeable and to have, from time to time, a cylindrical cavity of a slightly larger diameter than the diameter of the Pb wire that is being used.

In axis with the fixed matrix 13*a* a movable (knife) matrix 13*b* is provided that has the similar geometric and constructive characteristics as the fixed matrix 13*a*, plus the possibility of being able to rotate around an axis parallel to that of the cylindrical cavity of the fixed matrix or anyway to move in an offset position with respect thereto. This movement is what permits the cutting of the wire slug 7 introduced into the movable matrix 13*b*. The expeller punch 13*d* effects then ejection of the Pb cut-off from the movable matrix.

The cut-off is simultaneously collected by the clamp 12*a* provided therefor.

Upon opening of the first and second half-dies, the clamp 12*a* that has collected the cut-off from the shaping station 2 moves the slug 7 to the first deformation station 30 where the base part of the terminal pole, advantageously with a labyrinth, is formed.

The configuration of the deformation stations renders the apparatus particularly adapted to easily form labyrinth configurations with undercuts that are very difficult if not impossible to obtain with the prior art devices.

Optionally, the cut wire length can be previously calibrated at the calibration device 100.

Figure 4:
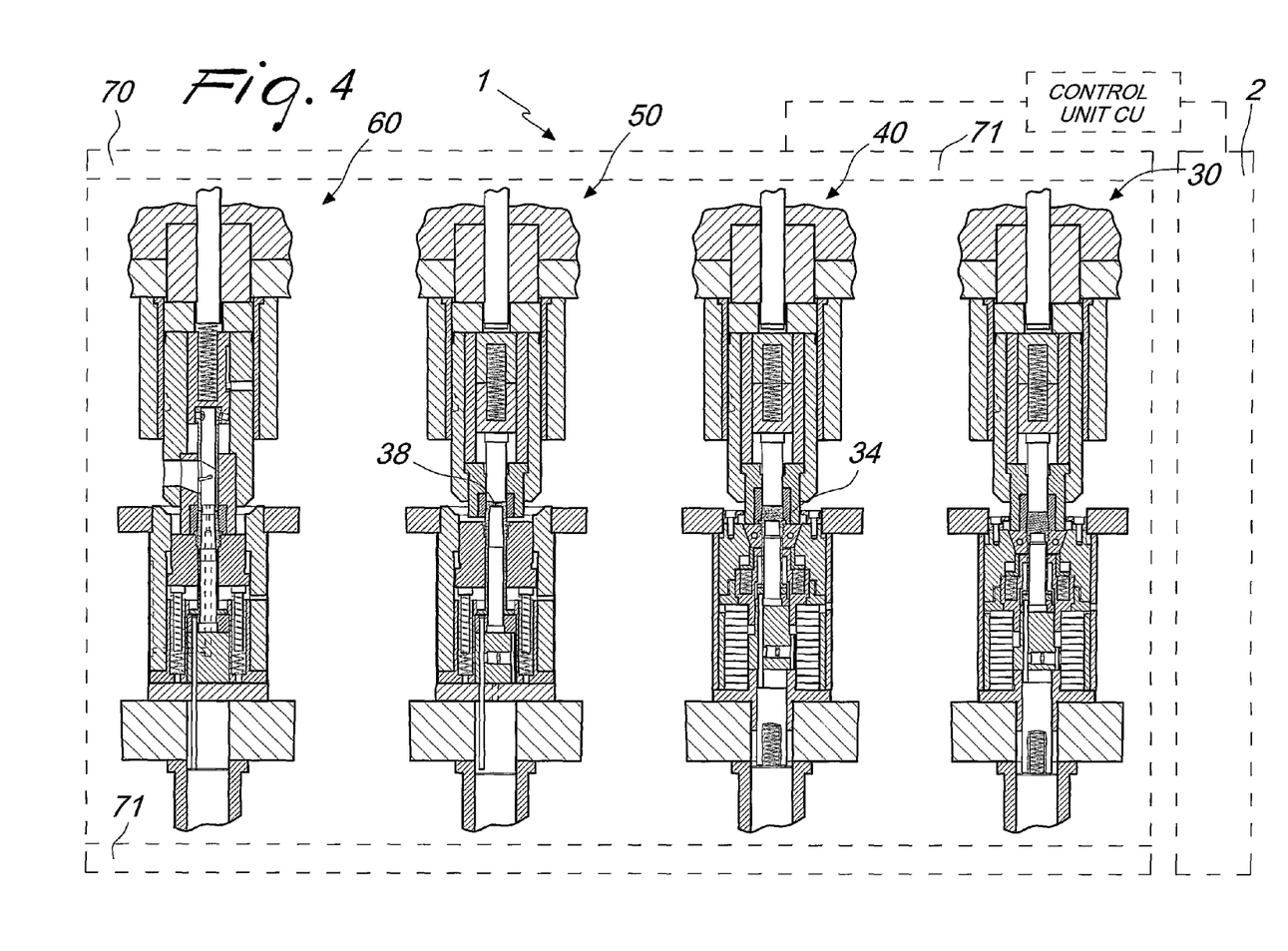
FIG. 4 is a front view showing, in cross-section, four deformation stations of the apparatus and illustrating four progressive and sequential deformation steps, carried out according to the method of the invention.

FIG. 4 shows the pressing sequence of the slug 7 at four different deformation stations 30, 40, 50, 60.

As shown in FIG. 5, that illustrates a deformation step carried out at a first station 30, the Pb cut-off slug is held in position along the same axis of the matrix by the clamp 12*a* while the movable part of the machine moves towards the fixed part.

In this phase the segmental die 27 is opened by the action of the springs 32, 33.

With the advancement of the movable part, the hammer punch 24 pushing the slug against the die punch 28, makes the expeller provided under the die punch 28, as shown in FIG. 1, and biased by a matrix expeller spring, give way.

This movement continues until the punch insert 25 and the punch holder 23 containing it touch the die 27 and force it to lower, against the bias of springs 32, 33, and to close on the slug to be shaped.

The entire Pb slug undergoes deformation that leads to it occupying the free volume provided inside the segmental die 27.

The opening and ejection step of the deformed slug can thereafter commence.

As the hammer punch 24 moves away there is also the release of the springs 32, 33 biasing the segmental die 27 that carry it back into its rest, open position, permitting extraction of the slug.

The Pb slug thus deformed remains now trigged (with interference) on the die punch 28 (last operation phase shown in FIG. 5).

The clamp 12*a* intervenes again to collect the deformed slug in correct position.

Actually, it may not be the same clamp 12*a* that supported the slug in the initial insertion step, widening immediately afterwards to permit the closure of the machine, but the clamp 12*a* of the following operation (deformation station) that, as soon as the opening of the machine has commenced, is transferred to this operation to collect the deformed slug and take it to the following station.

Operation at the other stations is similar to the various phases thereof being readily deducible by the skilled in the art from FIGS. 4, 6-8 and 11.

Thus, the method of manufacturing a lead terminal for an accumulator by plastic deformation on the cold-working apparatus 1 that has a shaping station 2 and at least one deformation station 30, 40, 50, 60, 80 comprises the steps of: a) shaping, at the shaping station 2 of the apparatus 1, the slug 7 that has a longitudinal extension along a longitudinal axis Y thereof such as to provide base 9 and contact 8 parts for the terminal and has a size commensurated to the size of the terminal end piece to be manufactured; b) transferring the slug 7 to said at least one deformation station of the apparatus; c) carrying out a first deformation of the slug 7 for inner and outer shaping of the base part thereof; and d) carrying out at least a second deformation of the slug 7 for further inner and outer shaping of the base part 9 thereof.

The steps c), d) are performed sequentially as progressive deformation steps.

A further step e) for carrying out a third deformation of the slug 7 for inner and outer shaping of the contact part 8 and of for a further inner shaping of the base part 9 thereof is further carried out.

The term "progressive deformation" is intended to mean that the plastic deformation of the slug up to its final finished shape suitable for a terminal pole, is made gradually, in successive deformation steps that prevent high stress to be exerted on the apparatus parts and at the same time are prone to be carried out with high velocity, and in a coordinated manner.

The term "sequentially" is intended to mean that the deformation steps are performed on the same slug, in sequence, at different deformation stations suitably equipped, or at the same deformation station, but anyway, at discrete moments that allow to contain the deformation forces.

Advantageously, step c) comprises forming on an outer surface region of the base part 9 of the slug the labyrinth configuration constituted by ridges that protrude from said outer surface of the base parts, that may have undercut, root portions, and forming of the cavity that has an extension inside the base part laying along said longitudinal axis of the slug; step d) comprises forming at an outer region of the slug, between the base and contact parts, of a crown 10 that is constituted by a protruding flange that has an edge bearing a plurality of notches 10*a*, and increasing the extension of the cavity along the longitudinal axis of the slug. Step e) comprises forming the outer surface of the contact part so as to have a truncated cone configuration with the larger base at the crown 10 and increasing still the extension of the cavity along the longitudinal axis of the slug so as to also extend inside the contact part for substantially all the longitudinal extension thereof but for a bottom end portion.

Figure 3:
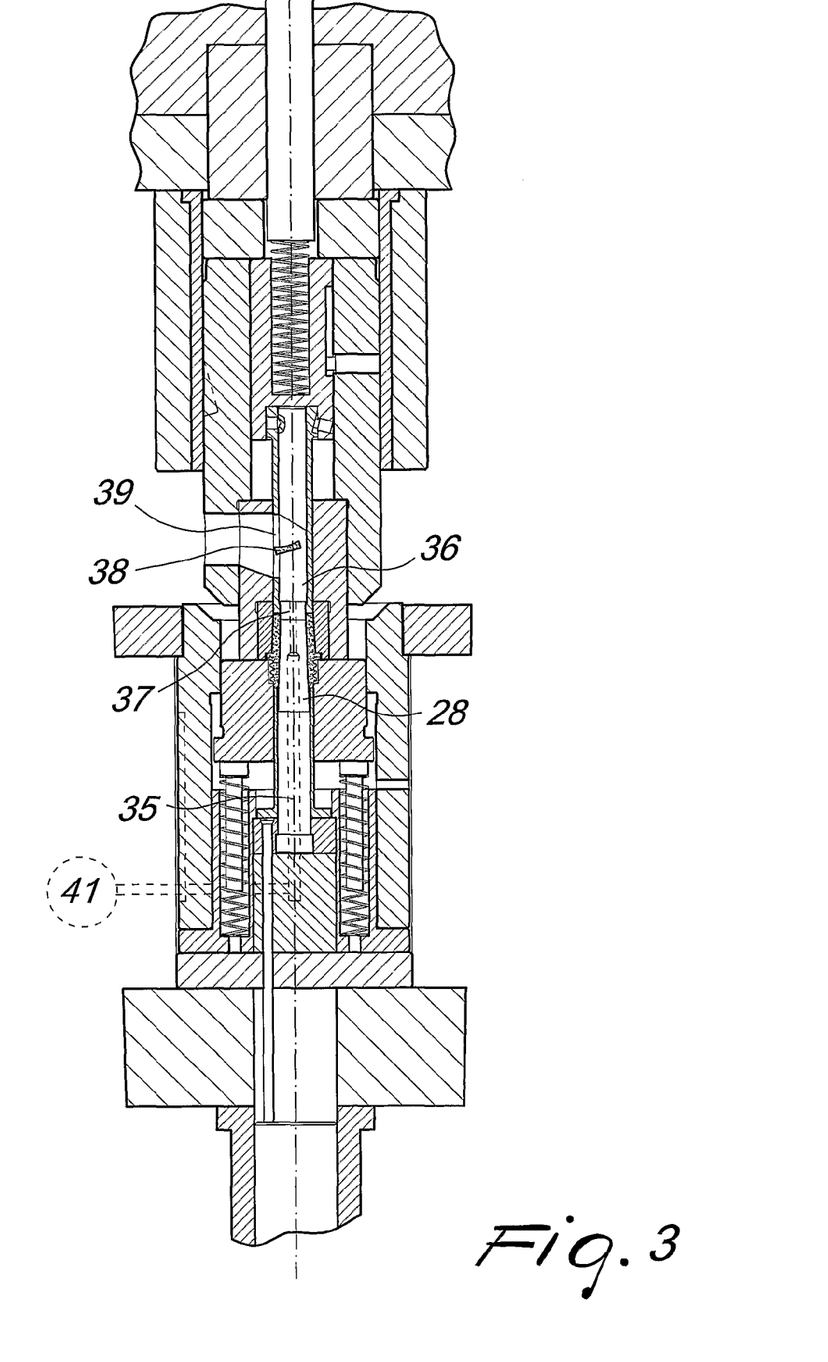
FIG. 3 is a cross-sectional front view of a deformation station of the apparatus suitable for providing a terminal pole with a through hole, according to the invention.

When the terminal to be made is of the type shown in FIGS. 2A-2D, i.e. having an axial through hole 11, the additional step f) is carried out that consists in cutting off the bottom end portion of the cavity so as to form the through hole 11 inside the slug, as illustrated in FIG. 3 and last operation phase of FIG. 4.

The apparatus for carrying out the invention may be provided, in a possible embodiment thereof, with only one deformation station and in which the working parts may be automatically exchangeable in accordance with the deformation step that has to be performed.

In a preferred embodiment the deformation steps are carried out at separate deformation stations 30, 40, 50, 60, 80 of the apparatus by providing, between each two consecutive said deformation steps, a respective additional transferring step.

The additional step f) comprises a knocking out of the cut bottom end portion 38 of the slug 7.

For high productivity purposes the apparatus is adapted and may be operated so that the deformation steps are carried out at the deformation stations 30, 40, 50, 60, 80 simultaneously. In particular each deformation step is carried out at a respective deformation station on a different slug that is in a different deformation phase of progressive deformation obtained following to a previous deformation step, the transferring steps being coordinated with the progressive deformation steps.

All the details described herein in relation with the illustrative, non-limiting preferred embodiment of the invention may furthermore be replaced with other technically equivalent ones that are known and obvious to the person skilled in the art.

The present invention is susceptible of modifications and variations all within the normal technical knowledge of the person skilled in the art.

In practice, the materials used, as well as the shapes and the dimensions, may be any according to requirements without thereby abandoning the scope of protection of the present invention as set forth by the appended claims.

The disclosures in Great Britain Patent Application No. 0425342.3 from which this application claims priority are incorporated herein by reference.

The invention claimed is:

1. A method of manufacturing a lead terminal for an accumulator by plastic deformation on a cold-working apparatus that has a shaping station and at least one deformation station, comprising the steps of:
   a) shaping, at the shaping station, a slug that has a longitudinal extension along a longitudinal axis thereof, said slug being dimensioned for forming a terminal piece, said slug being shaped to provide a base part and a contact part for forming the terminal piece;
   b) transferring the slug to said at least one deformation station of the apparatus;
   c) carrying out a first deformation of the slug for inner and outer shaping of the base part thereof; and
   d) carrying out a second deformation of the slug for performing at least a further inner and outer shaping of the base part thereof, and
   wherein the steps c) and d) are performed sequentially as progressive deformation steps, at discretely and successive moments, and
   wherein step c) comprises:
   forming by plastic deformation in a die of said at least one deformation station, on an outer surface region of the base part of the slug, a labyrinth configuration comprising at least one ridge that protrudes from said outer surface of the base part,
   shaping said at least one ridge by plastic deformation in said die to provide cusps which protrude radially from sides of a crown region of the at least one ridge,
   pressing onto said cusps to flatten at said crown region the at least one ridge and forming through migration of material from said cusps said at least one ridge to have a mushroom form providing at least one undercut root portion, and
   forming a cavity that has an extension inside said base part laying along said longitudinal axis of the slug.

2. The method of claim 1, further comprising a step e) for carrying out a third deformation of the slug for inner and outer shaping of the contact part and for a further inner shaping of the base part thereof.

3. The method of claim 2, wherein step e) comprises forming the outer surface of the contact part so as to have a truncated cone configuration with the larger base connecting to said base part and increasing the extension of said cavity along said longitudinal axis of the slug so as to extend from said base part inside said contact part for substantially all the longitudinal extension thereof but for a bottom end portion.

4. The method of claim 2, wherein said deformation steps are carried out at separate deformation stations of the apparatus and wherein between each two consecutive ones of said deformation steps a respective additional transferring step is provided.

5. The method of claim 4, wherein said deformation steps are carried out at said deformation stations of the apparatus simultaneously, each deformation step being carried out at a respective deformation station on a different slug that is in a different deformation phase of progressive deformation obtained following to a previous deformation step, the transferring steps being coordinated with the progressive deformation steps.

6. The method of claim 1, wherein the step d) further comprises performing an outer shaping of the slug for the shaping of the contact part of the terminal.

7. The method of claim 6, further comprising an additional step f) that comprises cutting off said bottom end portion of said cavity so as to form a through hole inside said slug.

8. The method of claim 7, wherein the additional step f) comprises knocking out of the cut bottom end portion of the slug.

9. The method of claim 1, wherein step d) comprises forming at an outer region of the slug, between said base and contact parts, of a crown that is constituted by a protruding flange that has an edge bearing a plurality of notches, and increasing the extension of said cavity along said longitudinal axis of the slug.

10. The method of claim 1, further comprising calibrating a length of a wire suitable to form the slug.

* * * * *